United States Patent Office 3,401,530
Patented Sept. 17, 1968

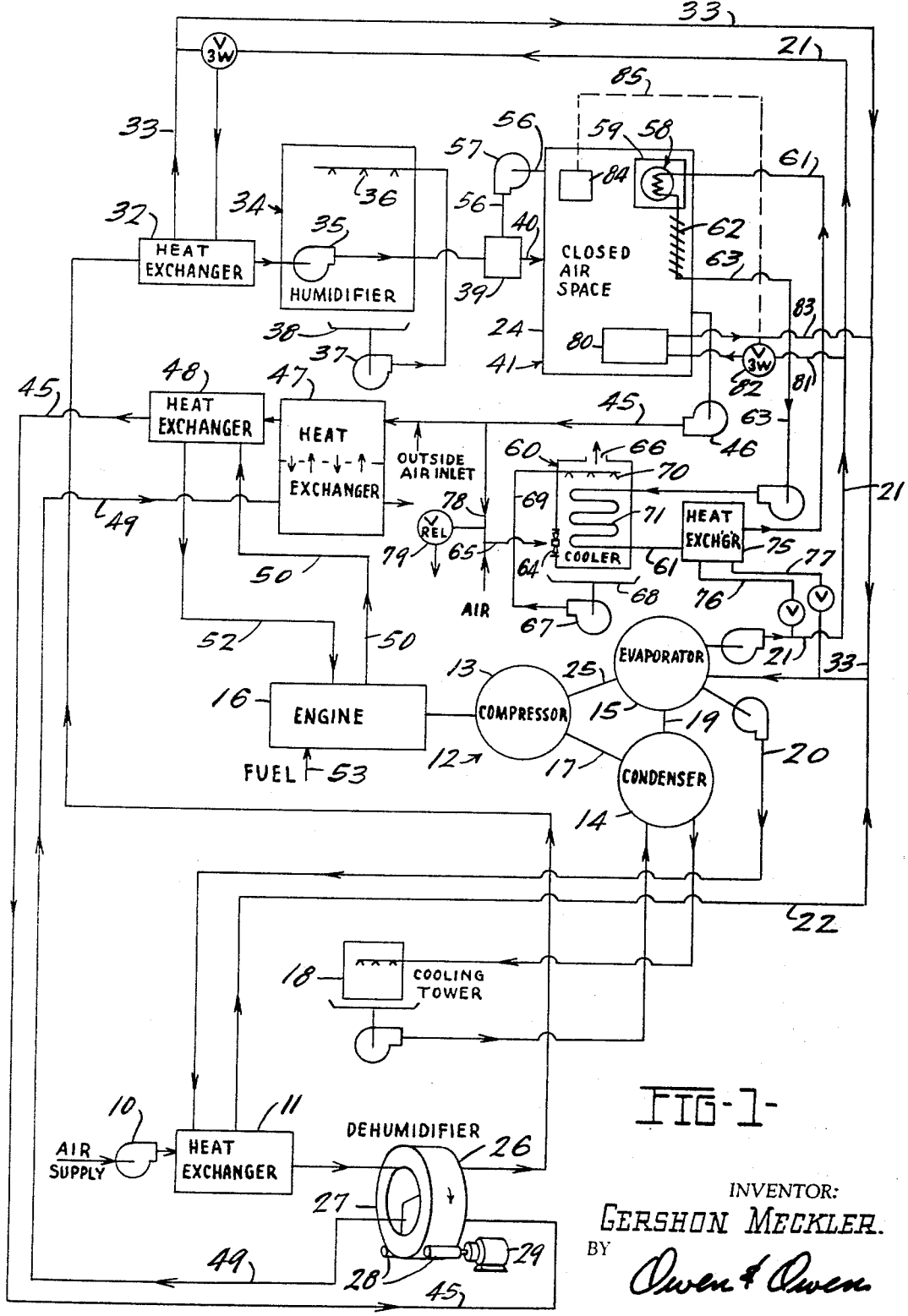

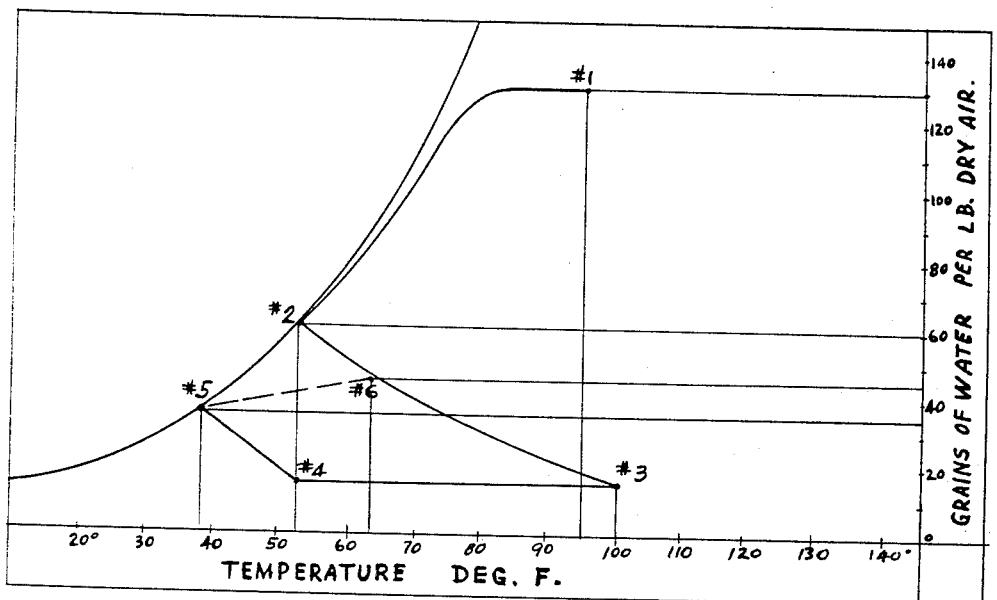
FIG-2-
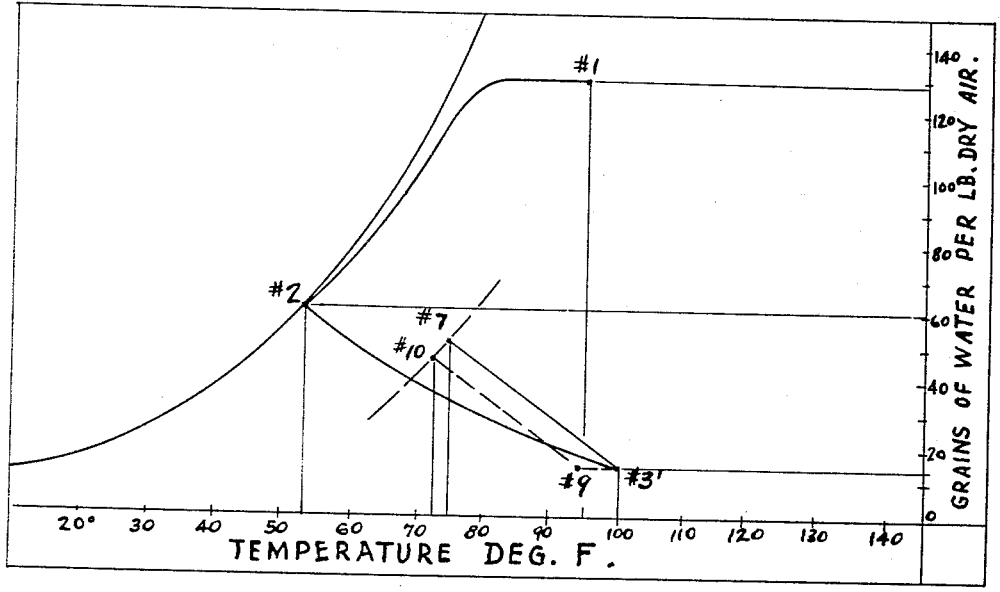
FIG-3-
INVENTOR:
GERSHON MECKLER.
BY
Owen & Owen
ATT'YS.

3,401,530
COMFORT CONDITIONING SYSTEM
Gershon Meckler, Atlanta, Ga., assignor to Lithonia
Lighting, Inc., Conyers, Ga., a corporation of
Georgia
Filed Dec. 19, 1966, Ser. No. 602,796
9 Claims. (Cl. 62—2)

ABSTRACT OF THE DISCLOSURE

A system for supplying comfort conditioned air to a closed air space. Hot, humid air is forced through an indirect heat exchanger for simultaneous cooling and dehumidifying. The air is then circulated through a desiccant dehumidifier to further reduce its moisture content. As moisture is removed from the air, liberated heat increases the air temperature. From the dehumidifier, the air is cooled in a second heat exchanger and then in a humidifier. The cooled and humidified air is mixed with air circulated from the closed space and is then carried to the closed space. Exhaust heat, from an internal combustion engine used to drive refrigeration apparatus for the heat exchangers, regenerates the desiccant in the dehumidifier.

The present invention relates to apparatus for conditioning air, and more particularly, to apparatus which will both cool and dehumidify air which is to be introduced into a space.

An object of the present invention is an improved comfort conditioning system in which air for a conditioned space is both cooled and dehumidified and in which waste heat from a heat engine is utilized as a heat exchange medium for the regeneration of the desiccant of a chemical dehumidifier.

Another object of the present invention is the use of a heat engine to provide both refrigeration capacity and heating capacity.

Further objects and advantages of the invention will become apparent from the following specification and drawings, in which:

FIG. 1 is a diagrammatic view of an apparatus for cooling and dehumidifying air according to the present invention;

FIG. 2 is a chart showing the psychometric path through which air may be taken by the conditioning system shown in FIG. 1 when operated according to a first embodiment of the invention; and FIG. 3 is a chart showing the psychometric path through which the air may be taken by the apparatus of FIG. 1 when operated according to a second embodiment of the invention.

Briefly, the present invention relates to air conditioning apparatus including a heat engine which is operatively connected to refrigeration apparatus. The system includes indirect heat exchange means effective to absorb heat from air circulated therethrough and to transfer the absorbed heat to the refrigeration apparatus. A dehumidifier which employs a desiccant to absorb moisture from the circulated air is provided, together with a regenerator for the desiccant. Means are also provided for directing exhaust heat from the heat engine to the regenerator and into heat exchange relationship with the desiccant. The system includes a humidifier for humidifying and consequentially cooling air passing therethrough. Circulating means are provided for circulating air through the indirect heat exchanger, through the dehumidifier, through the humidifier, and to a space to be conditioned. The system includes means effective to absorb heat and, as a consequence of such absorption, to remove heat from the space, and to transfer absorbed heat to the refrigeration machine.

It has been found that, with a proper design of the components of the apparatus of the invention, the available exhaust heat can be made substantially to match the requirements of the dehumidifier for regeneration.

The particular combination of elements of the present invention results in a balancing of heat loads to minimize wasting of energy.

Referring to FIG. 1 of the drawing, a comfort conditioning system, constructed according to the present invention, includes a blower 10 which forces air to be conditioned through a first indirect heat exchanger 11. A refrigeration machine 12 including a compressor unit 13, a condenser 14, and an evaporator 15 is driven by a heat engine 16, for example, an internal combustion engine. The refrigeration machine 12 is of the conventional mechanical type in which the compressor 13 discharges a refrigerant through a conduit 17 to the condenser 14, which is cooled by water from a cooling tower 18. Liquid refrigerant from the condenser 14 flows through a conduit 19 to the evaporator 15 where it expands to a gas and cools a fluid circulating medium, such as water. The refrigerated water is pumped into supply conduits 20 and 21. The supply conduit 20 is in communication with the first indirect heat exchanger 11. After the refrigerated water passes through the first indirect heat exchanger 11, and is warmed by the air flow through the exchanger 11, the warmed water is returned through a return conduit 22 to the evaporator 15. Refrigerant gas from the evaporator 15 is returned to the compressor 13 through a conduit 25.

Air leaving the first indirect heat exchanger 11 passes through a chemical dehumidifier 26 where it is dehumidified by a solid desiccant. Any type of equipment which will support a solid desiccant such as calcium chloride, silica gel, activated alumina, or the like, and which will enable regeneration, can be used. The dehumidifier 26 is of a preferred type wherein a solid desiccant is supported in a honeycomb material made of asbestos and supported within a drum 27. The drum 27 is supported by rollers 28, one of which is rotated by a motor 29. Air from the exchanger 11 passes through one sector of the drum 27, while air for regenerating the desiccant passes through another sector of the drum 27. The air leaving the dehumidifier 26 normally has approximately one-fourth the water content of that received from the first indirect heat exchanger 11 and its temperature is raised by the heat of absorption.

Air leaving the chemical dehumidifier 26 then passes to a second indirect heat exchanger 32. Water from the conduit 21 is supplied to the exchanger 32, and is returned from the exchanger 32 to the evaporator 15 through a return conduit 33. Air which leaves the second indirect heat exchanger 32 has very little moisture and is at a low temperature, preferably between 50° F. and 60° F.

The air then passes to a humidifier 34. The humidifier 34 humidifies and consequentially cools air passing therethrough. The humidifier 34 may include a blower 35 to offset pressure drop through the equipment. The humidifier 34 causes the air to come in contact with water, e.g., under generally adiabatic conditions. Sensible heat from the air causes water evaporation and this lowers the dry bulb temperature of the air. The humidifier 34 includes a spray head 36 which is supplied with water from a pump 37. The pump 37 is supplied with make-up water from a suitable source (not illustrated) in addition to water which has previously passed through the humidifier 34, without being evaporated, and which is received by a pan 38. It is preferable that the air leaving the adiabatic washer or humidifier 34 be above 32° F. to prevent frost from collecting on the ducts and air handling equipment.

The second indirect heat exchanger 32 and the humidifier 34 are therefore operated under conditions such that the air leaving the humidifier 34 is above freezing temperature. Normally, the humidifier 34 is operated so that the air leaving the adiabatic type humidifier 34 is saturated.

After the air passes through the humidifier 34, it enters an induction or control box 39. From the induction box 39, it passes through a duct 40 into a closed air space 41 which is to be conditioned.

As previously stated, the solid desiccant in one sector of the chemical dehumidifier 26 is being regenerated while air is being dehumidified by the desiccant in another sector. Air at a low absolute humidity is circulated to the air space 41. The system disclosed in the drawing circulates part of the air that is withdrawn from the space 41 through a duct 45 and uses it for regeneration of the desiccant in the chemical dehumidifier 26. The withdrawn air is driven through the duct 45 by a blower 46. Normally, it requires approximately one-fourth of the quantity of air that is dehumidified by the chemical dehumidifier 26 for regeneration of the desiccant. The air stream that is used for regeneration must be heated to approximately 300° F. before being used to dry the desiccant. In the present embodiment, heat exchangers 47 and 48 are utilized to heat the air in the duct 45. The air to be heated in the duct 45 passes through one-half of a rotating member of the heat exchanger 47. Exit air from the chemical dehumidifier 26 enters a duct 49 and passes through the other half of the rotating member of the heat exchanger 47. Heat from the exit air in the duct 49 is picked up by the rotary member of the heat exchanger 47 and is transferred to the air stream in the duct 45, as is schematically represented by arrows. Of course, other types of heat exchangers may be utilized.

Additional heat must be supplied to the air in the duct 45 to raise the stream to the 300° F. temperature required for regeneration. This additional heat is supplied by the heat exchanger 48. The heat exchanger 48 is supplied with high temperature heat exchange fluid from the heat engine 16 through a supply conduit 50. After the heat exchange fluid passes through the exchanger 48, it is returned to the heat engine 16 through a return conduit 52. The heat exchange fluid within the return conduit 52 may be further cooled by any suitable heat exchanger (not shown) before returning to the cooling system of the heat engine 16.

Fuel is supplied to the heat engine 16 through a fuel line 53. Fuel that is supplied to the heat engine, in this case an internal combustion engine, is converted both into shaft work for driving the compressor 13 and into exhaust heat. A substantial part of the exhaust heat is absorbed in a heat exchange fluid, normally water, in a cooling system associated with the heat engine 16. As mentioned above, this high temperature heat exchange fluid from the engine 16 is directed to the heat exchanger 48 through the supply conduit 50.

The operation of the system, partially described above, will now be explained with reference to the FIG. 2 psychometric chart. Considering ambient or outside air at 95° F. containing 132 grains of moisture per pound of dry air (point 1 in FIG. 2) entering the blower 10, the air passes through the first indirect heat exchanger 11, to which refrigerated heat exchange fluid is supplied by the refrigeration machine 12. The first indirect heat exchanger 11 lowers the air stream temperature to 53° F., and dehumidifies to 60 grains of moisture per pound of dry air (point 2 in FIG. 2). The chemical dehumidifier 26 is operated under such conditions that air leaving the dehumidifier 26 is at a dry bulb temperature of 100° F. and contains 13 grains of moisture per pound of dry air (point 3 in FIG. 2). The air then passes through the second indirect heat exchanger 32 and leaves the exchanger at approximately 53° F. with 13 grains of moisture per pound of dry air (point 4 in FIG. 2). The second indirect heat exchanger 32 is supplied with chilled cooling medium by the refrigeration machine 12.

After leaving the second indirect heat exchanger 32, the air is humidified and consequentially cooled, e.g. substantially adiabatically, in the humidifier 34. As shown in FIG. 2, the humidification is to saturation. The air leaves the humidifier 34 at approximately 39° F. dry bulb, and contains 34 grains of moisture per pound of dry air (point 5 in FIG. 2). Air at 39° F. would cause discomfort if introduced directly into the space 41; therefore, the conditioned air from the humidifier 34 is mixed in the induction box 39 with air recirculated from the space 41 by means of a duct 56 and a blower 57. One part by volume of conditioned air from the humidifier 34 can be mixed with two parts by volume of recirculated air from the space. The mixture entering the space 41 through the duct 40 is represented by point 6 in FIG. 2 and is at a dry bulb temperature of 63° F. containing 46 grains of moisture per pound of dry air.

Referring again to FIG. 1, when a high temperature heat source, such as a light source 58, delivers heat to the closed space 41, the amount of refrigeration required in the second indirect heat exchanger 32 can be kept to a minimum by providing a panel 59. The panel 59 is positioned to intercept a substantial proportion of the high temperature radiation of the light source 58. The intercepted heat energy can then be transferred to a coolant circulated in heat transfer relation with the panel 59, and at a temperature above that of the closed space and the panel 59, e.g., cooling water from an evaporative cooler 60 delivered through a supply conduit 61. Effluent from the panel 59 is returned to the evaporative cooler 60 through a thermal louver 62 which is positioned to intercept solar energy entering the space 41, for example, through windows. After leaving the thermal louvers 62, the effluent is returned to the evaporative cooler 60 through a return conduit 63.

The cooling circuit comprising the panel 59, the thermal louver 62, the evaporative cooler 60, and the conduits 61 and 63 constitutes an important part of the system. Two substantial sources of problem heat in the space 41, or in any space to be comfort conditioned, are solar heat which enters the space through windows and radiant energy from artificial light sources, particularly in buildings which are designed for high lighting intensities. It is possible to intercept and transfer to relatively high temperature water, for example, at 80° F. or higher, a major part of the problem heat from these two sources by means of the panel 59 and the thermal louver 62. Under most ambient conditions which prevail, it is also possible to reject such intercepted heat from the system in the evaporative cooler 60 by inducing, by means of a fan 64, a flow of ambient air received through a conduit 65. Such cooling air passes through the evaporative cooler 60 and is discharged through a vent 66. The evaporative cooler 60 is preferably of the indirect type. Cooling is achieved by evaporation of water circulated by a pump 67 from a pan 68, through a conduit 69 which supplies water to spray nozzles 70 in direct contact with circulated air, and back to the pan 68. Water from the return conduit 63 is circulated through a coil 71 of the evaporative cooler 60 where it is cooled and then is discharged to the supply conduit 61 for return to the panel 59.

As indicated above, both heat from artificial light sources and solar heat are high temperature sources of problem heat in the sense that high temperature water, e.g., at 80° F. or higher can be used effectively to reduce heating of the space by such sources. From an energy conservation standpoint, it is usually logical to remove heat from the thermal louver 62 and the panel 59 by using high temperature water from the evaporative cooler 60 as described above. In some cases, however, when ambient humidity is high, it is preferable to use refrigeration to remove a part of the heat from such devices. Accordingly, the system also includes an indirect heat exchanger 75 in heat exchange relationship with the supply conduit 61. Chilled water can be circulated, if required, from the evaporator supply conduit 21 through a supply line 76 to the exchanger 75 for indirect heat exchange with the water from the evaporative cooler 60 and for ultimate return through a return line 77 to the evaporator return conduit 33.

As has been indicated previously, about one-fourth of the relief air from the space 41 is required for circulation through the duct 45 for regeneration of the chemical dehumidifier 26. This means that about three-fourths of the relief air is available for circulation through a duct 78. The duct 78 is in communication with both the duct 45 and the duct 65 which leads to the evaporative cooler 60. The relatively low humidity of relief air, which is withdrawn from the closed air space 41, is a significant factor, particularly under conditions of high ambient humidity, in improving the effectiveness of the evaporative cooler 60. By increasing the effectiveness of the evaporative cooler 60, a higher proportion of the solar load and of the lighting load intercepted by the thermal louver 62 and the panel 59 can be transferred to the circulated water.

Under other ambient conditions, for example, under low humidity ambient air conditions, air from the relief duct 78 can be vented to atmosphere through a relief valve 79. In this case, outside air is circulated from an inlet (designated by legend) through the duct 45 and the exchangers 47 and 48 to the chemical dehumidifier 26.

It will be appreciated that temperature control for the apparatus of FIG. 1, operated as previously discussed by reference to FIG. 2, is desirable to compensate for changes in heat load. This can be accomplished by mixing with the conditioned air delivered to the space 41; (a) air recirculated from the space under conditions of maximum heat load, (b) air from the space which has been heated, for example by artificial lights, under conditions of minimum heat load, or (c) combinations of the two under conditions of intermediate heat load. Apparatus for providing such temperature control can be, for examples, of the type disclosed in U.S. Patent No. 3,193,001 and in patent application Ser. No. 563,228 filed July 6, 1966.

Temperature in the space 41 can also be controlled, when air supplied thereto is at substantially the desired dry bulb temperature, by means of a panel 80 to which chilled heat transfer fluid is supplied through a supply line 81, which is in fluid communication with the evaporator supply conduit 21. A three-way valve 82 directs chilled heat transfer fluid to the panel 80 or to a return line 83. The valve 82 is under the control of a sensing device 84, as is schematically represented by a dashed line 85.

The invention also contemplates the operation of the apparatus, shown in FIG. 1, so that substantially all of the sensible cooling in the space is done by lateral extensions provided on the panel 59. This is accomplished by pumping heat from the lateral extensions of the panel 59 to heat exchange fluid in thermal contact therewith by means of, for example, a thermal-electric heat pump (not shown). This maintains the extensions at a sufficiently low temperature to perform the required cooling. Air is delivered to the space 41 at substantially the dry bulb tempeartures desired. Temperature control is achieved through the heat pump by regulation of the temperature of the extensions of the panel 59.

FIG. 3 of the drawings shows the psychometric path of air passing through the apparatus of FIG. 1 when the lateral extensions of the panel 59 or the panel 80 are used to control the temperature of the space 41, as described above. The air is at the same conditions at the points 1', 2', and 3' as in the FIG. 2 chart, point 3' representing air at 100° F. and approximately 13 grains of moisture per pound of dry air. Point 3' represents the condition of the air immediately after leaving the chemical humidifier 26. Under these conditions, operation of the second indirect heat exchanger 32 is not required. However, operation of the second indirect heat exchanger 32 to accomplish at least a small amount of refrigeration is sometimes advantageous, even when the major load is carried and temperature control is provided by the extensions of the panel 59 or by the panel 80. Referring to FIG. 3, if the second indirect heat exchanger 32 is not utilized, the air is directed through the humidifier 34 and the air leaves at 75° F. and 40% relative humidity (point 7). However, if desired, refrigerated fluid from the refrigeration machine 12 may be circulated through the extensions of the panel 59 or through the panel 80. This provides means effective to absorb heat and, as a consequence of such absorption, to remove heat from the space 41 and to transfer such absorbed heat to the refrigeration machine 12.

If the second indirect heat exchanger 32 is utilized, which is preferable, the air is cooled to point 9 in FIG. 3, by the second indirect heat exchanger 32, before being humidified and cooled in the humidifier 34 to the point 10. Points 7 and 10 represent air sufficiently dry to accomplish humidity control within the closed space 41, and the lower absolute humidity of the air at point 10 enables the use of lower temperatures in the extensions of the panel 59 or in the panel 80 thereby providing more effective control.

It is to be understood that the method and apparatus according to the invention are particularly advantageous in many respects. An important feature is the provision of extremely dry air, as represented by the points 3 and 3' in the psychometric charts of FIGS. 2 and 3, which results from using waste heat or exhaust heat from the heat engine 16 to regenerate the solid desiccant of the chemical dehumidifier 26. The low humidity enables the use of the humidifier 34, essentially to convert sensible heat to latent heat. In the embodiment represented by the psychometric chart of FIG. 2, the air which is conditioned and circulated performs the entire function of humidity control and sensible cooling in the space 41, while, in the embodiment illustrated by the psychometric chart of FIG. 3, the air so conditioned and circulated performs the function of humidity control while substantially the entire job of sensible heat control within the space 41 is performed by the extensions of the panel 59 or by the panel 80. The ability to perform a required conditioning job in the space 41 with a minimum of circulated air is an important feature of the apparatus and method according to the present invention, particularly in a multi-story building. Because the use of a low pressure air circulating system of minimum size is feasible, the necessity for a high pressure air circulating system or for a low pressure system which occupies a substantial percentage of the entire available space within a building enclosure is avoided.

When air is circulated to the conditioned space 41 at approximately the minimum rate required for ventilating thereof, and in substantially the condition represented by point 5 in FIG. 2, such air is incapable of performing the entire sensible cooling job within the space 41 unless at least a substantial part of the heat from the light source 58 and from solar energy, which would ordinarily enter the space through a window adjacent the thermal louver 62, is intercepted to minimize the space requirement for sensible cooling. A substantial portion of such heat is intercepted, in the apparatus according to the invention, by the panel 59 and the thermal louver 62 to enable the accomplishment of the required sensible cooling by the conditioned air, or by the panel 80, or the lateral extensions of the panel 59 (see FIG. 3 embodiment). As has been previously discussed, the heat so intercepted is transferred to air vented from the evaporative cooler 60 and any excess is transferred to a chilled heat transfer fluid in the indirect heat exchanger 75.

The ability to convert sensible heat to latent heat in the humidifier 34 is a particularly significant feature of the invention. The internal combustion engine 16 is used to drive the refrigeration machine 12 and at the same time the exhaust heat from the engine 16 is used to supply the necessary heat for regeneration of the chemical dehumidifier 26, as shown in FIG. 1.

The total load imposed upon the system is made up of a plurality of components attributable: (1) to ambient wet bulb temperature, (2) to ambient dry bulb temperature, (3) to solar energy entering the space, (4) to lights and other inanimate energy sources, and (5) to occupancy of the space by living beings. The present invention counteracts problem heat from each of these five sources by using a combination of waste heat energy for dehumidifier regeneration and mechanical energy or shaft work with respect to the refrigeration machine.

Under conditions of relatively high ambient humidity, the temperature to which the heat transfer fluid circulated to the evaporative cooler 60 from the panel 59 and the thermal louvers 62 can be cooled in the evaporative cooler 60 is higher than when ambient humidity is lower. As a consequence, evaporatively cooled water returned through the supply conduit 61 to the panel 59 and the thermal louver 62 varies as a direct function of ambient humidity, and the dissipation of intercepted radiant energy from lights and solar energy varies as an inverse function of ambient humidity. This means that an increase in ambient humidity necessitates increased sensible cooling to accomplish conditioning of the space 41. The increased sensible cooling can be provided by the second indirect heat exchanger 32, by the panel 80, or by the heat exchanger 75, and, in any case, requires an increase in shaft work. An increase in ambient humidity also requires increased dehumidification capacity to maintain the same absolute humidity in the air supplied to the space 41. Because only heat from the internal combustion engine 16 is used in the present invention to provide dehumidification, and because the increased output of the engine 16 required to drive the refrigeration machine 12 involves a consequential increase in exhaust heat, there is cooperation among the several components and a built-in compensating type energy balance.

A similar result occurs with an increase in load in the space 41 resulting from an increase in ambient dry bulb temperature, an increase in solar load, an increase in load from lights or other inanimate energy sources, or from an increased occupancy of the space. An increase in load from any of these sources requires increased sensible cooling of the space 41. Sensible cooling is accomplished in part by the second indirect heat exchanger 32 or by the panel 80, and, in part, by the conversion of sensible heat to latent heat in the humidifier 34. An increase in the output of the internal combustion engine 16 to increase the output of the refrigeration machine 12 and to enable the second indirect heat exchanger 32 or the panel 80 to do increased sensible cooling also involves a consequential increase in exhaust heat from the internal combustion engine 16. Again, the increased exhaust heat is used to increase the capacity of the chemical dehumidifier 26 to dehumidify air which is subsequently delivered to the humidifier 34. However, in these cases, there is no increase in ambient humidity, so the result is that air of lower absolute humidity is delivered to the humidifier 34, thereby increasing its capacity to convert sensible heat to latent heat. The air circulated from the humidifier 34 to the space 41 is then able to do an increased portion of the sensible cooling. Again, we have an energy balance resulting from the increased shaft work and an increased use of exhaust heat from the internal combustion engine 16. Occupancy of the space 41 by living beings increases both the sensible cooling load and the humidity load and is, therefore, somewhat analogous to a simultaneous increase of ambient wet bulb and ambient dry bulb conditions. In the instance where an increased load is a result of increased occupancy by human beings within the space 41, a part of the increased dehumidification capacity which results from an increased load on the internal combustion engine 16 can be used, if required, to lower the absolute humidity of the air delivered to the space 41, while the rest is used to lower the dry bulb temperature of the air so delivered. The combination shown in FIG. 1, operated in the manner just described, makes effective use, relative to the conditioning of the space 41, of both shaft work and exhaust heat which results from the operation of the internal combustion engine 16, thereby utilizing substantially all available energy obtained from the fuel supplied to the heat engine. This result is accomplished by using the exhaust heat from the engine 16 in connection with the regeneration of the chemical dehumidifier 26 and operating such dehumidifier to deliver air to the second indirect heat exchanger 32 at an absolute humidity below the maximum which would provide the required humidity control in the space 41, and then converting sensible heat in the conditioned air to latent heat in either the humidifier 34 or the evaporative cooler 60. This reduction in sensible heat reduces the requirement for refrigeration by chilled water in the heat exchanger 32, in the heat exchanger 75, or in the panel 80. Optimum balancing of exhaust heat and shaft work can be achieved in the FIG. 1 apparatus only when the humidifier 34 or an equivalent is utilized.

Ordinarily, when the second indirect heat exchanger 32 is used to chill the air delivered to the humidifier 34, the conditioned air delivered from the humidifier 34 is adequate to condition the space 41 effectively when water evaporatively cooled in the cooler 60 is delivered through the supply conduits 61 to the panel 59 and the thermal louver 62. The indirect heat exchanger 75, however, is available whenever required to reduce the temperature of the evaporatively cooled water from the cooler 60.

Under conditions of winter operation, a series flow of water from the panel 59 through the thermal louver 62, through the evaporative cooler 60, and back to the panel 59 is particularly significant. The function of the panel 59 and of the thermal louver 62 is to intercept and to transfer to the evaporatively cooled water the major portion of the load which would otherwise be imposed upon the air conditioning system by artificial lights and by the sun, respectively. Whenever it is necessary to supply heat in conditioning the space 41, this can be done by the water, for example at 80° F. to 85° F., leaving the panel 59 and as it flows through the thermal louver 62. Water at such a temperature is effective to compensate for heating losses from the space 41 under most ambient conditions, but it is also effective to absorb heat from the thermal louver 62 which results from the interception by the louver of solar energy. Accordingly, this arrangement is not only effective under conditions of winter operation, but also prevents or at least minimizes temperature fluctuations which occur in many air conditioning systems as a result of the intermittent incidence of solar energy on windows adjoining the conditioned spaces. This result is achieved in part because the water in the thermal louver 62 is at a substantially neutral temperature relative to the space but at a low temperature relative to solar energy and, in part, because glass is substantially opaque to radiation from a louver at 80° F. to 85° F. As a consequence, the louver 62 reacts to load fluctuations incident to variations in amount of solar energy, rather than to changes in space conditions which would result from such fluctuations, and supplies heat by radiation and convection to the adjacent window surface to compensate for heat losses by conduction and convection but not through the window to the outside.

The thermal louver 62 can be of the type disclosed and claimed in U.S. Patent No. 3,013,397. Such an assembly can be merely a plurality of hollow, extruded louver members mounted in a window opening, and operatively associated with headers or the like to enable the circulation of water through the louvers, or can be a metal mesh or chain-mail drapery slidably mounted on a conduit through which a heat-transfer fluid is circulated, or a sliding panel or screen of thin metal sheets, preferably apertured and slidably mounted in a multiple track system through which a heat-transfer fluid is circulated. The draperies or the sliding panels, when mounted in a window opening, are placed in thermal contact with a heat transfer fluid circulated through the conduit or track system. In most instances, the louvers would be movable to enable varying the amount of solar heat and light passing through the assembly. Hollow extruded louvers can be rotated to enable such variation, and the draperies, panels or screens can be mounted for sliding movement to enable such variation. Other types of thermal louvers may also be utilized. For example, window structures can be used which are effective to intercept solar heat by means of metal strips associated with the glass and which have means for conducting heat which results from interception of the radiant heat energy to a circulated heat transfer fluid. The latter means can be metal strips in thermal contact with heat transfer fluid or a transparent, thermally-conductive, film on at least one of the major glass surfaces in thermal contact with the fluid (see, for example, U.S. Patent 3,268,720, FIG. 2). Heat absorbing glasses are particularly effective, so long as means are provided for transferring the heat absorbed to the circulated heat transfer fluid. The heat absorbing glasses can be of the stable type, which have constant light and heat absorption characteristics or can be of the type which increase in opacity relative to radiation in the visible and heat ranges of frequency when solar energy is directly incident thereon and return to a state of reduced opacity when solar energy is no longer directly incident. A structure of either of the latter types, under conditions of winter operation, is effective as a full equivalent of the previously discussed thermal louver structure only when there is a radiation shield, for example, a pane of heat absorbing glass or of ordinary glass, disposed exteriorly of the glass which is in thermal contact with the circulated heat transfer fluid, as such radiation shield is necessary to prevent direct radiation to the outside and consequential excessive heat losses.

An important feature of the present invention is the fact that inasmuch as heat at elevated temperatures must be used for the regeneration of the chemical dehumidifier 26, a heat engine can advantageously be used both to drive the refrigeration equipment and to produce exhaust heat which can be used to regenerate the chemical desiccant, and also for heating, when required. Conservation of energy is therefore accomplished, inasmuch as the heat which is normally exhausted from a heat engine is used to effect the necessary regeneration of the chemical desiccant, or for heating. Furthermore, when additional shaft work is required to increase the output of the refrigeration machine 12, this increases the exhaust heat from the internal combustion engine 16, which in turn increases the efficiency of the humidifier 34, thereby increasing the output and efficiency of the apparatus. The combination of the refrigeration machine 12, the heat engine 16, and the humidifier 34 is an important feature of the present invention.

What I claim is:

1. Air conditioning apparatus comprising, a refrigeration machine, a heat engine effective to convert a fuel into shaft work and exhaust heat, means operatively connecting said heat engine in driving relationship with said refrigeration machine, indirect heat exchange means effective to absorb heat from air circulated therethrough and to transfer such absorbed heat to said refrigeration machine, a dehumidifier which employs a desiccant to absorb moisture from air circulated therethrough, a regenerator for the desiccant of said dehumidifier, means for directing exhaust heat from said heat engine to said regenerator and into heat exchange relationship with the desiccant, a humidifier for humidifying and consequentially cooling air passing therethrough, circulating means for circulating air through said indirect heat exchanger, through said dehumidifier, through said humidifier, and to a space to be conditioned, and means effective to absorb heat and, as a consequence of such absorption, to remove heat from the space, and to transfer absorbed heat to said refrigeration machine.

2. Apparatus according to claim 1, wherein the means effective to absorb heat and, as a consequence of such absorption, to remove heat from the space, and to transfer absorbed heat to said refrigeration machine, includes a second indirect heat exchanger.

3. Apparatus according to claim 1, wherein the means effective to absorb heat and as a consequence of such absorption, to remove heat from the space, and to transfer absorbed heat to said refrigeration machine, includes panel means positioned for radiative heat transfer with the air space.

4. Apparatus for maintaining a predetermined humidity and a predetermined temperature in an air space comprising, in combination, a refrigeration machine, a heat engine effective to convert a fuel into shaft work and exhaust heat, means operatively connecting said heat engine in driving relationship with said refrigeration machine, first indirect heat exchange means effective to absorb heat from air circulated therethrough, a chemical dehumidifier which uses a desiccant to absorb moisture from air passing therethrough, a regenerator for the desiccant of said dehumidifier, heat exchange means for directing exhaust heat from such heat engine to said regenerator for effecting a heat transfer between such exhaust heat and such desiccant thereby regenerating such desiccant, a humidifier for humidifying and consequentially cooling air passing therethrough, means for circulating air in said system sequentially through said first indirect heat exchanger, said chemical dehumidifier, and said humidifier, and for supplying air from said humidifier to the space, and means effective to absorb heat and, as a consequence of such absorption, to remove heat from the space, and to transfer heat to said refrigeration machine.

5. Apparatus according to claim 4 including, recirculating means effective to remove and mix air from the space with conditioned air from said humidifier and means for introducing the mixture into the space, said mixture being delivered to the space at a temperature below the predetermined temperature of the space.

6. Apparatus according to claim 5 including exchanger means effective to intercept artificial light heat and solar heat, a cooling means, and conduit means in fluid communication with said exchanger means and said cooling means, said cooling means being effective to circulate a coolant to said exchanger means through said conduit means, said coolant being supplied at a temperature above the predetermined temperature of the space.

7. Apparatus according to Claim 6, wherein said exchanger means includes at least one water cooled lighting panel.

8. Apparatus according to claim 7, wherein said exchanger means includes at least one thermal louver.

9. Apparatus according to claim 6, wherein said cooling means includes an evaporative cooler.

References Cited

UNITED STATES PATENTS

| 2,257,478 | 9/1941 | Newton | 62—238 X |
| 2,667,766 | 2/1954 | Cummings | 62—238 X |
| 3,009,331 | 11/1961 | Hewett et al. | 62—271 X |
| 3,200,606 | 8/1965 | Hewett et al. | 62—271 X |
| 3,247,679 | 4/1966 | Meckler | 62—323 X |

WILLIAM J. WYE, *Primary Examiner.*